(12) United States Patent  
Polyakov et al.

(10) Patent No.: US 8,014,630 B1
(45) Date of Patent: Sep. 6, 2011

(54) METHOD AND APPARATUS FOR REPRESENTING IMAGE DATA USING DIGITAL FILTERING AND ADAPTIVE PARAMETERIZATION

(75) Inventors: Vladislav Polyakov, Los Gatos, CA (US); Boris Gorbatov, Sunnyvale, CA (US); Fedor Trushkin, Moscow (RU); Alexander Pashintsev, Cupertino, CA (US)

(73) Assignee: Evernote Corporation, Sunnyvale, CA (US)

( * ) Notice: Subject to any disclaimer, the term of this patent is extended or adjusted under 35 U.S.C. 154(b) by 1161 days.

(21) Appl. No.: 11/799,946

(22) Filed: May 2, 2007

(51) Int. Cl.
 G06K 9/20 (2006.01)
 G06K 9/18 (2006.01)
 G06T 11/20 (2006.01)
(52) U.S. Cl. .................. 382/282; 345/442; 382/186
(58) Field of Classification Search .............. 382/282
 See application file for complete search history.

(56) References Cited

U.S. PATENT DOCUMENTS

| | | | |
|---|---|---|---|
| 5,237,649 A | 8/1993 | Yamada | |
| 5,473,472 A | 12/1995 | Temme et al. | |
| 5,473,742 A * | 12/1995 | Polyakov et al. | 345/442 |
| 5,608,856 A | 3/1997 | McInally | |
| 5,694,535 A * | 12/1997 | Broekhuijsen | 345/442 |
| 5,731,820 A * | 3/1998 | Broekhuijsen | 345/442 |
| 6,018,591 A | 1/2000 | Hull et al. | |
| 6,044,171 A * | 3/2000 | Polyakov et al. | 382/159 |
| 6,101,280 A | 8/2000 | Reynolds | |
| 6,111,588 A | 8/2000 | Newell | |
| 6,115,051 A * | 9/2000 | Simons et al. | 345/442 |
| 6,304,677 B1 | 10/2001 | Schuster | |
| 6,404,434 B1 | 6/2002 | Shimada et al. | |
| 6,771,266 B2 * | 8/2004 | Lui et al. | 345/442 |
| 7,079,144 B1 | 7/2006 | Shimada et al. | |
| 7,212,205 B2 | 5/2007 | Uesaki et al. | |
| 7,437,003 B1 | 10/2008 | Gorbatov et al. | |
| 7,542,603 B2 | 6/2009 | Rosel | |
| 2004/0109001 A1 | 6/2004 | Grandine et al. | |
| 2005/0156930 A1 | 7/2005 | Nishioka et al. | |
| 2006/0290698 A1 | 12/2006 | Wang et al. | |
| 2009/0027398 A1 | 1/2009 | Frisken | |

FOREIGN PATENT DOCUMENTS

WO WO94/03853 2/1994

* cited by examiner

*Primary Examiner* — David P Zarka
(74) *Attorney, Agent, or Firm* — Blakely Sokoloff Taylor & Zafman LLP

(57) ABSTRACT

In one embodiment, a method for encoding source data includes defining a source polygon using a parametric representation associated with the source data, and identifying one or more portions of the source polygon. The method further includes passing a filter throughout the entire sequence of the samples representing the source polygon, and performing a piecewise, portion by portion, re-parameterization of the source polygon using the corresponding portions of the filtered polygon to obtain an updated sequence of samples representing the source polygon. The passing of the filter and the performance of the piecewise re-parameterization are then iteratively repeated until a convergence condition is satisfied, to provide encoded data.

25 Claims, 15 Drawing Sheets

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 |
|---|---|---|---|---|---|---|---|---|---|---|---|---|---|---|---|---|---|---|---|---|---|---|---|---|---|---|---|---|---|
| 0.0 | 0.9 | 2.3 | 3.7 | 4.6 | 5.0 | 5.4 | 6.1 | 7.0 | 7.9 | 8.8 | 9.5 | 9.8 | 10.0 | 11.2 | 13.2 | 15.6 | 17.8 | 18.9 | 19.2 | 20.5 | 22.5 | 24.4 | 25.5 | 25.6 | 26.1 | 27.1 | 28.1 | 28.7 | 29.0 |

METHOD AND APPARATUS FOR REPRESENTING IMAGE DATA USING DIGITAL FILTERING AND ADAPTIVE PARAMETERIZATION

FIELD OF THE INVENTION

This invention relates generally to image data processing, and more particularly to processing and representation of image data using digital filtering and adaptive parameterization.

BACKGROUND OF THE INVENTION

Image data can often be available in, or convertible into, a vector-graphic form. Vector graphics typically provide discrete, multi-component parametric representations of curves. For example, a pen stroke in simple electronic ink is a plain curve defined by a two-component parametric representation, i.e. a sequence of sample points specified as coordinate pairs. Space curves defined by a three-component parametric representation can be provided, in particular, by advanced graphic tablets sensitive to the distance between pen and the tablet's surface. A number of extra components, representing physical entities other than spatial coordinates, may be provided in addition to parametric representation of a curve. For example, variable-thickness lines drawn by means of pressure-sensitive graphic tablets are plain curves defined by a three-component sequence of samples, in which an extra sample, representing pressure, is added to each pair of coordinate samples.

Quality of vector-graphic data often suffers from noise. For example, visual quality of electronic ink may be affected by combined noise of motor tremor and digitization, especially in hand-held devices. Noise can also result from bitmap-to-vector conversion of image data. In particular, the combination of contour extraction and automatic tracing is known to be a noise intensifying procedure. There are many filtering techniques for denoising image data in vector-graphic form. One common approach is to apply a low-pass digital filter to every component, or to each of selected components, in the sequence of samples.

In addition, vector graphic data typically require reduction in data size. Compression of such data as electronic ink allows to accumulate a useful volume of handwritten notes and drawings in a limited storage and to save time required for data transmission. There are many compression techniques commonly used for vector graphics processing. One typical approach is based on selective discarding of redundant sample points in the original discrete parametric representation of a curve. The excessive sample points can be detected and removed by a trial and error method, in which a sample point is tested whether or not it can be skipped as a knot for polygonal interpolation of a curve.

Another way to eliminate excessive sample points is to start with limited number of critical points, such as cusps and local maxima and minima, as the knots of polygonal interpolation. Such a procedure is described in International Application WO 94/03853 entitled A Method and Apparatus for Compression of Electronic Ink, published on Feb. 17, 1994. This procedure incorporates also denoising and smoothing by digital filtering as a preprocessing, application-specific step. Examples are given of applying triangular, Hanning, or median filters prior to compression.

The compression approach described in International Application WO 94/03853 can be improved using a sequential, segment-by-segment refinement procedure described in U.S. Pat. No. 6,101,280 issued to D. E. Reynolds and entitled Method and Apparatus for Compression of Electronic Ink, in which an additional knot is selected from original points to reduce the deviation of a given segment if needed. As a preprocessing step, a moving average (3-tap rectangular) filter is applied to produce a smoothed version of a curve. The smoothed curve is used to detect critical points and is then abandoned because its shape tends to be significantly distorted.

Shape distortion as a result, of filtering is a major problem in vector graphics processing. For example, in cursive writing, relatively small fragments may be very important for visual perception with respect to both legibility and aesthetic appearance, but noise in electronic ink often creates disturbances that are comparable in size with these critical fragments. Generally, the coordinate signals of handwriting and drawing, and the noise in electronic ink tend to have partially overlapped spectra. When filtering electronic ink, such overlapping tends to cause shape distortion and residual noise. Additional complications may also arise due to high variability in the individual manner of handwriting and in hardware-specific noise. Typically, as a result of low-pass filtering, the sharp cusps in electronic ink are cut, the critical fragments of handwriting are partially lost to smoothing, and handwritten lines look like they are somewhat shrunk in a vertical direction.

A technique addressing the shape distortion problem is disclosed in U.S. application Ser. No. 11/013,869 invented by B. E. Gorbatov et al. and entitled System and Method for Handling Electronic Ink (hereinafter "Gorbatov"), the teachings of which are hereby incorporated by this reference. Gorbatov repeatedly uses a low-pass, smoothing digital filter (instead of polygonal interpolation) for curve reconstruction in the above-mentioned trial and error process of discarding excessive points. In particular, in this curve reconstruction procedure (referred to as upsampling), a recursive low-pass approximation filter is applied to generate a trial version of a curve each time a sample point under testing is removed from the current representation.

It should be noted that during the procedure of discarding excessive points the discrete parametric representation of the curve undergoes certain modifications. In the procedure disclosed in Gorbatov, each next trial sub-sequence of sample points is filtered as a sequence of parametrically equidistant points. It means the new parameter is chosen for each next representation of a curve. These modifications depend on the filter used for curve reconstruction. Hence, the finally obtained representation is adapted to a chosen type of filtering in time (space) domain. Therefore, the process can generally be characterized as curve representation utilizing digital filtering and adaptive parameterization.

Filtering with adaptive parameterization, as described above, allows for better denoising and better visual quality of electronic ink under the same compression ratio requirements. However, in practice, the process is still found to be prone to occasional cusps cutting and some other local distortions.

The previously discussed trial and error process based on polygonal interpolation can also be interpreted as adaptive parameterization, in which parametric representation is adapted for curve reconstruction using piecewise linear interpolation. The same is true for the polygon refinement method disclosed by U.S. Pat. No. 6,101,280 discussed above. There are other data processing methods that allow for parametric representation of a curve being adapted for polynomial or piecewise-polynomial reconstruction. The adaptation is typically achieved by means of an iterative transformation-reparameterization procedure that may use piecewise Discrete Fourier Transform or Discrete Cosine Transform for polynomial approximation and an updatable parameterization table for reparameterization. Such a procedure is disclosed in U.S. Pat. No. 5,473,742 issued to V. G. Polyakov et al. and entitled Method and Apparatus for Representing Image Data Using Polynomial Approximation and Iterative Transformation-Reparameterization Technique.

The transformation-reparameterization procedure is known to be an efficient data compression and curve reconstruction tool. The latter property, for example, is employed in U.S. Pat. No. 6,771,266 issued to Lui et al. and entitled Method and Apparatus for Improving the Appearance of Digitally Represented Handwriting, in which a pen stroke is rendered on the screen as a polyline, and then the transformation-reparameterization procedure of U.S. Pat. No. 5,473,742 is used to refresh the stroke with an improved visual quality.

The transformation-reparameterization procedure, designed primarily as a compression tool rather than a filtering tool, does provide filtering as a concurrent effect, due to transformation part of its transformation-reparameterization cycle. However, because filtering in transform domain is known generally as less flexible and efficient in the majority of real life problems than filtering in time (space) domain, it would be desirable to explore further opportunities for efficient denoising associated with filtering in time (space) domain and adaptive parameterization.

As computing becomes faster and the memory more capacious, there is a higher demand for efficient denoising as part of vector-graphic data processing and, in particular, electronic ink processing. A high subjective quality of denoised data is desired, up to having the resulting images perceived as noiseless and distortion-free.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE INVENTION

Figure 1A:
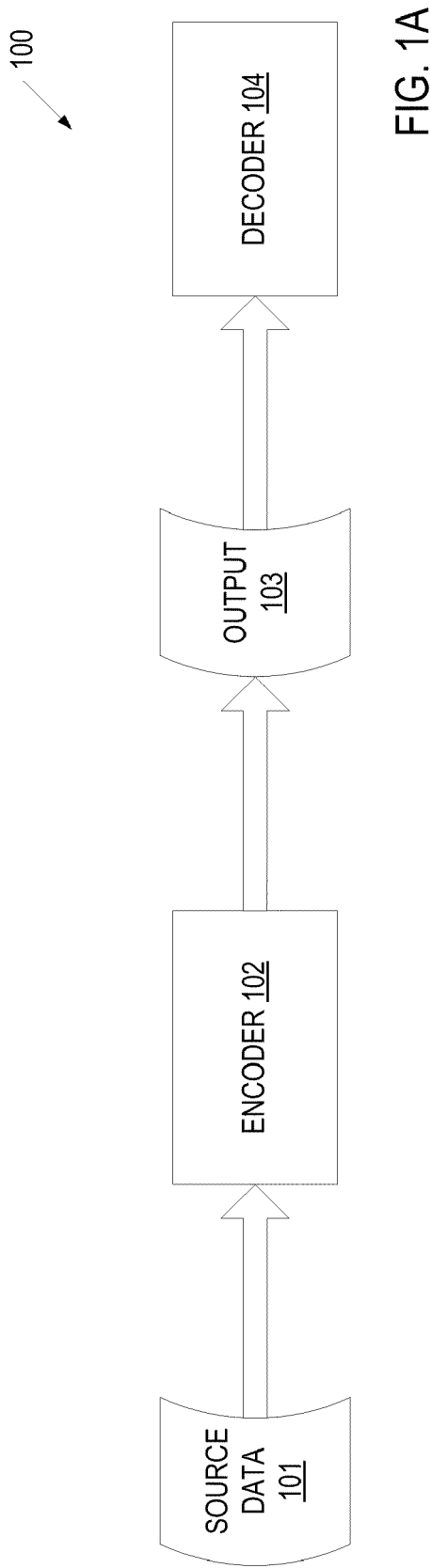
FIG. 1A is a block diagram of an exemplary system in which embodiments of the invention may operate.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.)), etc.

System Overview

FIG. 1A illustrates an exemplary system 100 for handling image data, in which embodiments of the invention may operate. The image data handled by the system 100 may be available in vector-graphic form. For example, the image data may include line-drawn graphics known as electronic ink. Alternatively, the image data may be convertible into vector-graphic form. For example, drawings and handwritten materials presented as bitmaps can be converted in vector-graphic form by means of automatic or manual tracing. Similar conversion procedures can also be used for contours extracted from the halftone, color, and volumetric images.

System 100 includes an encoder 102 that encodes source image data 101 for storage. In particular, the encoder 102 uses parametric representation of a curve associated with the source data 101. For example, in the case of electronic ink, the source data 101 may include a sequence of samples provided by a graphic tablet coupled to a computer, where each sample is represented by a pair of Cartesian coordinates. In one embodiment, the encoder 102 performs denoising and size reduction of the source data by performing iterative global filtering in time (space) domain and piecewise reparameterization of the curve associated with source data, as will be discussed in more detail below in conjunction with FIGS. 3 and 10. The resulting output is stored in a storage medium 103 (e.g., in a data repository or database). The storage medium 103 and the encoder 102 may be hosted by the same machine. Alternatively, the storage medium 103 and the encoder 102 may be hosted by different machines coupled to each other via a wired or wireless network (e.g., local network or public network).

The system 100 may also include a decoder 104 that can access the storage medium 103 directly or via a network. The decoder 104 reconstructs the denoised source data from the output 103. A procedure known as interpolation filtering can be used to reconstruct the denoised source data. In one embodiment, the decoder 104 reconstructs the denoised data using an iterative procedure of global filtering-piecewise interpolation that will be discussed in more detail below in conjunction with FIG. 6.

Figure 1B:
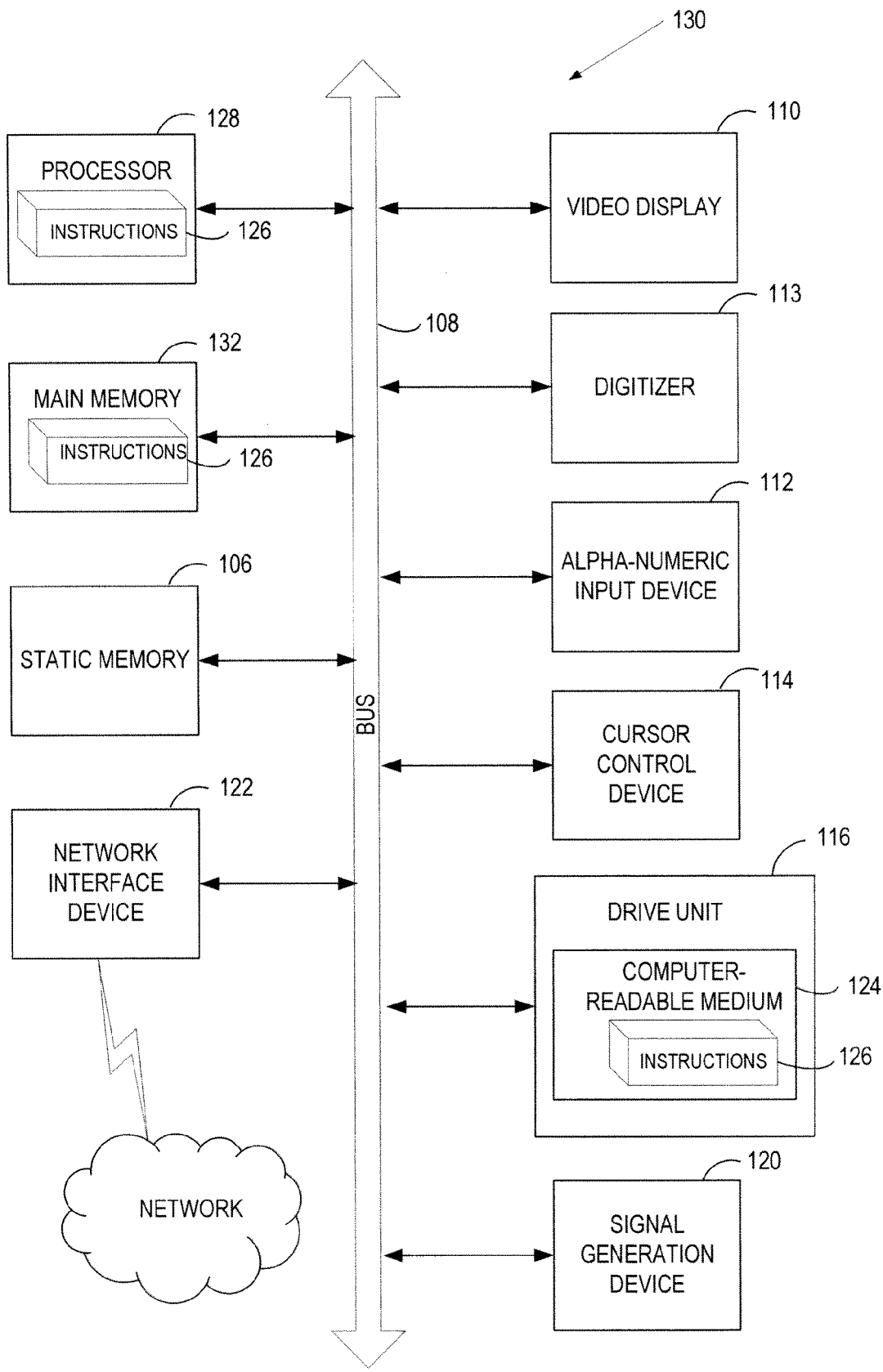
FIG. 1B is a block diagram of an exemplary computer system that may be used to perform one or more of the operations described herein.

FIG. 1B is a block diagram of an exemplary computer system 130 (e.g., a machine hosting an encoder 102 and/or a decoder 104 of FIG. 1) that may be used to perform one or more of the operations described herein. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 130 includes a processor 128, a main memory 132 and a static memory 106, which communicate with each other via a bus 108. The computer system 130 may further include a video display unit 110 (e.g., a liquid crystal display (LCD) or a cathode ray tube (CRT)). In one embodiment, the computer system 130 also includes a pen digitizer 113 and accompanying pen or stylus (not shown) to digitally capture freehand input. Although the digitizer 113 is shown apart from the video display unit 110, the usable input area of the digitizer 113 may be co-extensive with the display area of the display unit 110. Further, the digitizer 113 may be integrated in the display unit 110, or may exist as a separate device overlaying or otherwise appended to the display unit 110.

The computer system 130 also includes an alpha-numeric input device 112 (e.g., a keyboard), a cursor control device 114 (e.g., a mouse), a disk drive unit 116, a signal generation device 120 (e.g., a speaker) and a network interface device 122.

The disk drive unit 116 includes a computer-readable medium 124 on which is stored a set of instructions (i.e., software) 126 embodying any one, or all, of the methodologies described above. The software 126 is also shown to reside, completely or at least partially, within the main memory 132 and/or within the processor 128. The software 126 may further be transmitted or received via the network interface device 122. For the purposes of this specification, the term "computer-readable medium" shall be taken to include any medium that is capable of storing or encoding a sequence of instructions for execution by the computer and that cause the computer to perform any one of the methodologies of the present invention. The term "computer-readable medium" shall accordingly be taken to include, but not be limited to, solid-state memories, optical and magnetic disks, and carrier wave signals.

Figure 2:
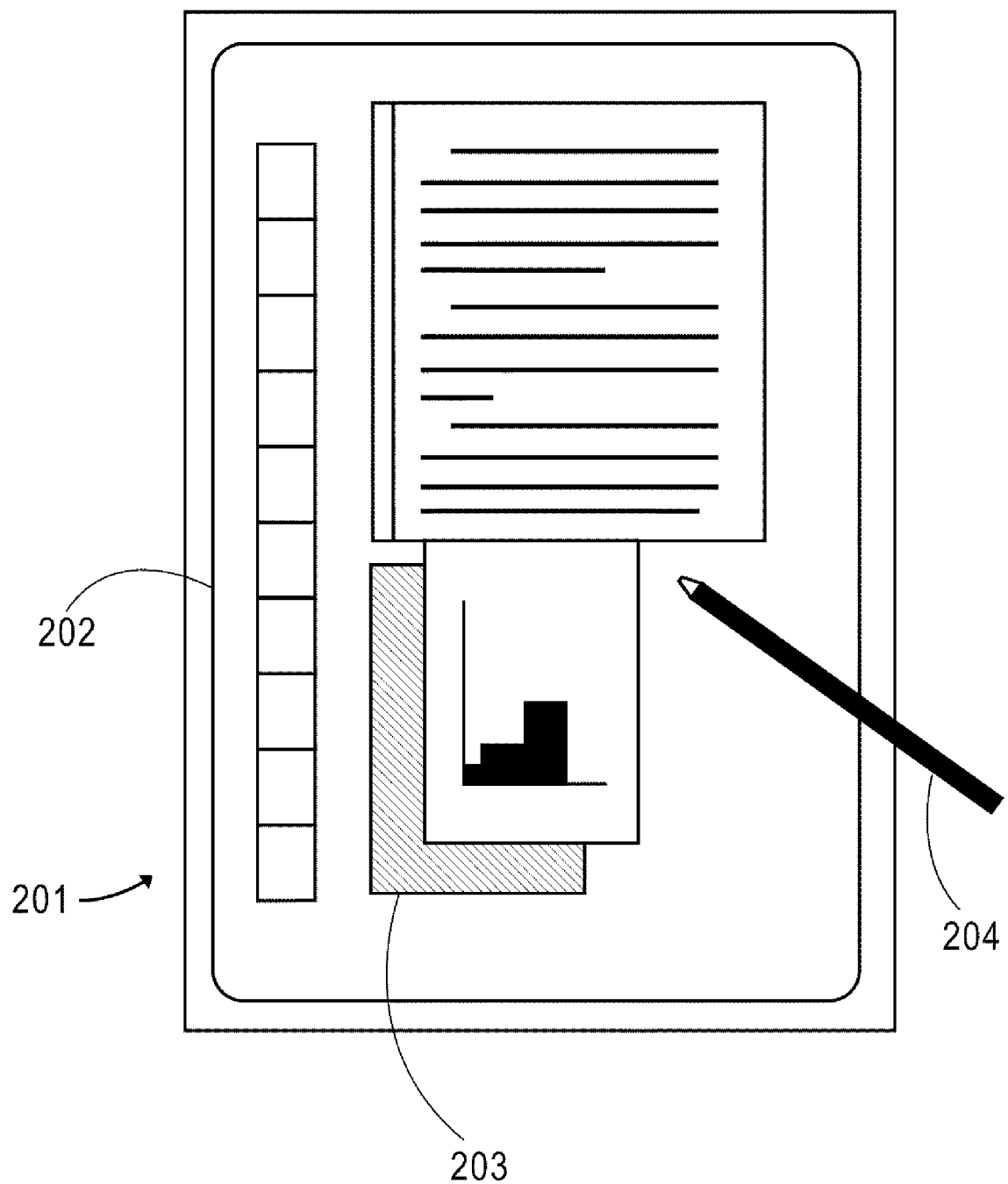
FIG. 2 illustrates an exemplary tablet and stylus computer that can be used with embodiments of the present invention.

FIG. 2 illustrates a tablet and stylus computer that can be used in accordance with some embodiments of the invention. Any or all of the features, subsystems, and functions in the system of FIG. 1B can be included in the computer of FIG. 2. Tablet PC 201 includes a large display surface 202, e.g., a digitizing flat panel display such as a liquid crystal display (LCD) screen, on which a plurality of windows 203 is displayed. Using stylus 204, a user can select, highlight, and write on the digitizing display area. Examples of suitable digitizing display panels include electromagnetic pen digitizers, such as the Mutoh or Wacom pen digitizers. Other types of pen digitizers, e.g., optical digitizers, may also be used. The computer 201 interprets marks made using stylus 204 in order to manipulate data, enter text, and execute conventional computer application tasks such as spreadsheets, word processing programs, and the like.

A stylus may be equipped with buttons or other features to augment its selection capabilities. In one embodiment, a stylus could be implemented as a "pencil" or "pen", in which one end constitutes a writing portion and the other end constitutes an "eraser" end, and which, when moved across the display, indicates portions of the display to be erased. Other types of input devices, such as a mouse, trackball, or the like could be used. Additionally, a user's own finger could be used for selecting or indicating portions of the displayed image on a touch-sensitive or proximity-sensitive display. Consequently, the term "user input device", as used herein, is intended to have a broad definition and encompasses many variations on well-known input devices.

Encoding Functionality

Figure 3:
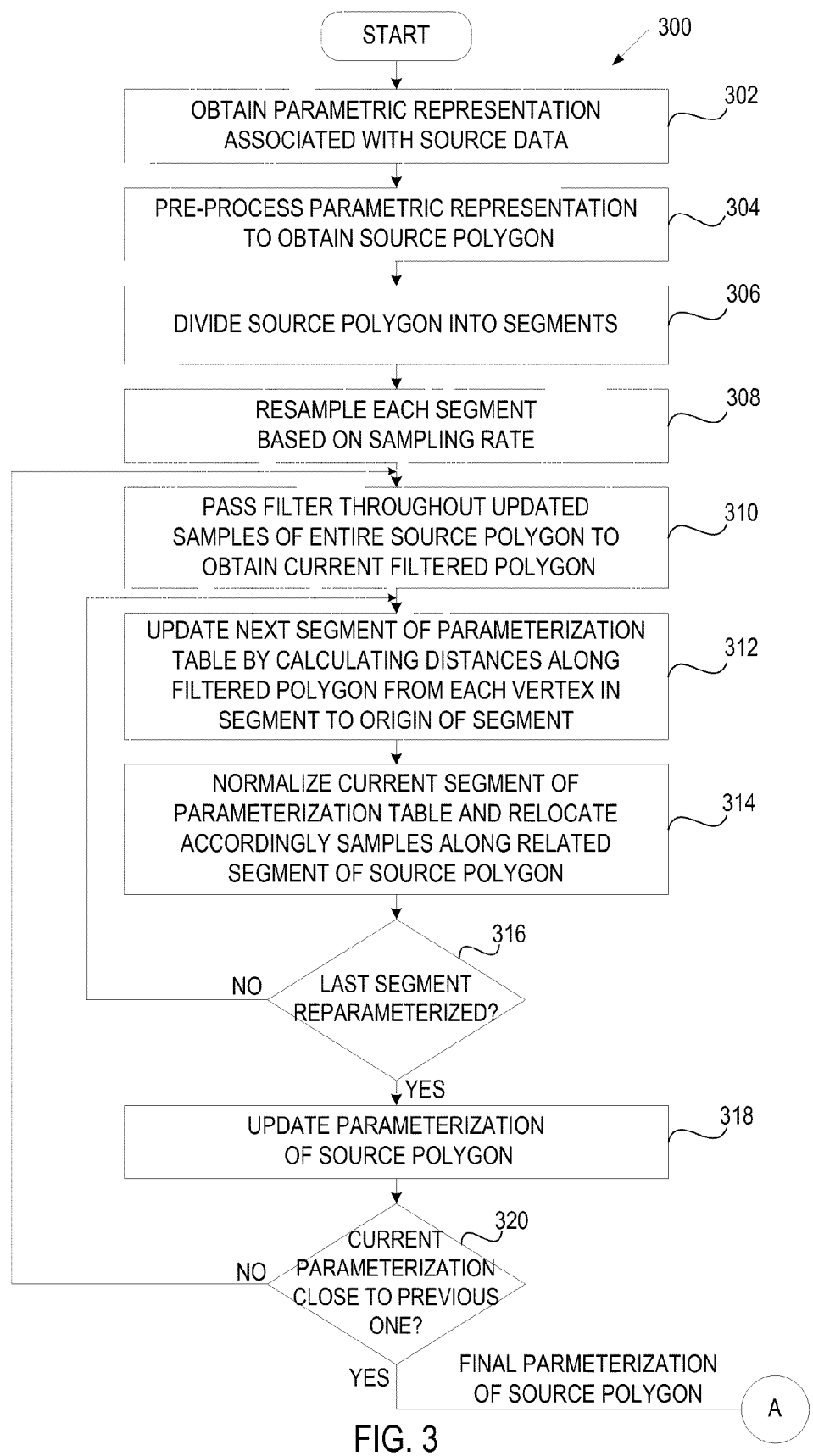
FIG. 3 is a flow diagram of one embodiment of an encoding method.

FIG. 3 is a flow diagram of an encoding method 300 according to some embodiments of the invention. The method may be performed by processing logic that may comprise hardware (e.g., circuitry, dedicated logic, etc.), software (such as run on a general purpose computer system or a dedicated machine), or a combination of both. In one embodiment, processing logic resides in an encoder (e.g., encoder 102 of FIG. 1).

Referring to FIG. 3, method 300 begins at block 302 with processing logic obtaining parametric representation of a curve associated with source data. The parametric representation may be, for example, a sequence of two-coordinate or three-coordinate samples provided by an input device, such as a graphic tablet.

Figure 4:
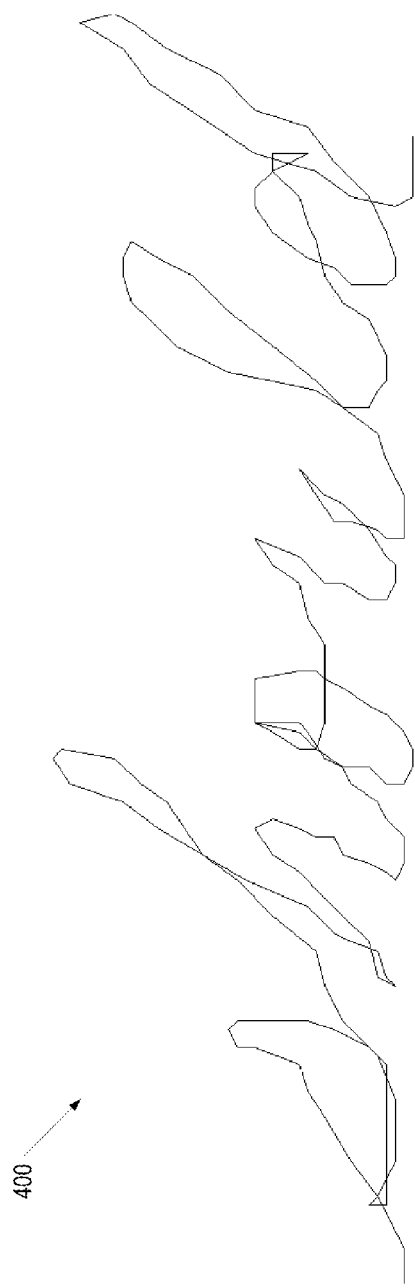
FIGS. 4, 5A-5G illustrate encoding functionality according to some embodiments of the invention.

At block 304, processing logic preprocesses the parametric representation of the source data to discard repetitive samples, defines a source polygon using the remaining samples as vertices, and stores the source polygon for future use. FIG. 4 illustrates an exemplary source polygon 400 for a specimen of source data in the form of noisy electronic ink. The specimen is a pen stroke captured as a plain curve by a graphic tablet. A preprocessed pen stroke is represented by 189 samples used as vertices of the plain source polygon.

Returning to FIG. 3, at block 306, processing logic divides the source polygon into portions referenced thereafter as segments (e.g., if the curve is relatively long and has a complex shape). At block 308, processing logic resamples each segment to adjust the segments' sampling rates. The sampling rates may or may not be the same for all segments. In one embodiment, the size of resampled source polygon may be reduced, as compared to the source data, by resampling the segments with relatively low sampling rates.

Figure 5A:
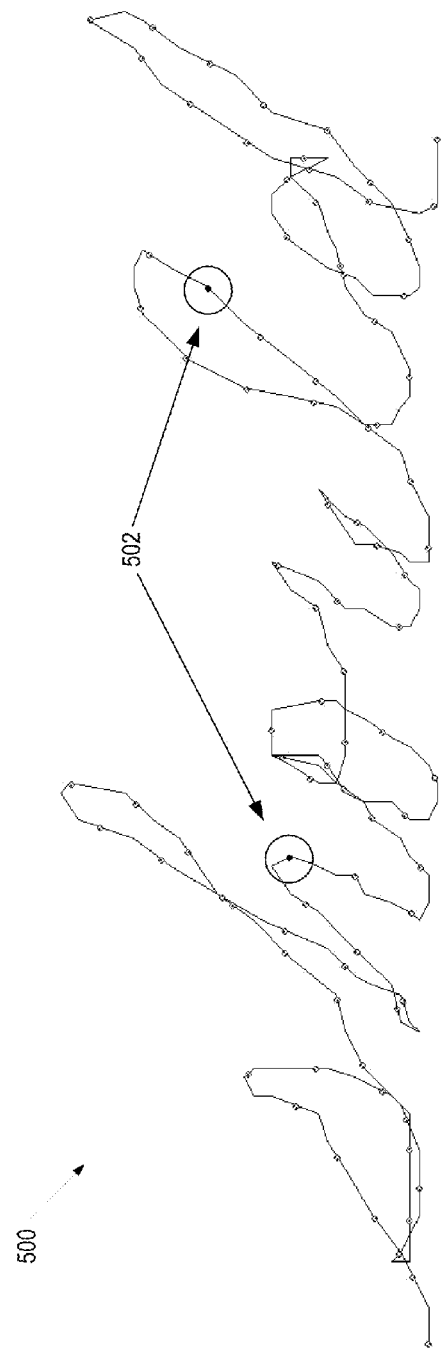

FIG. 5A illustrates the segmented and resampled source polygon 500 for specimen 400 of FIG. 4, in accordance with one embodiment of the invention, The source polygon 500 is divided into three segments of equal arc length. The boundaries of the segments are identified by black circles 502. Each segment has 30 new sample points (including boundary points 502), with the total size of the resampled source polygon being equal to 88 sampling points. The sample points are placed equidistantly with respect to the arc length of the source polygon 500. Thus, an initial discrete parametric representation of each segment (and of the entire source polygon) is, in this particular example, a natural representation, with the arc length serving as a parameter.

Returning to FIG. 3, once the resampling is completed, the sequence of new samples is registered as an updatable parametric representation of the source polygon. This sequence can be denoted as $$\{x_{n,i}, y_{n,i}\}; n=0,1,2,\ldots,N-1; i=0,1,2,\ldots, \quad (1)$$

where n enumerates the samples, and i denotes the number of filtering iterations performed thus far (i=0 at this stage of the process).

At block 310, processing logic begins the iterative cycle of global filtering-piecewice reparameterization by passing a filter throughout the entire sequence (1), in turn through each component of the sequence. Processing logic then stores the resulting filtered representation of the source polygon in an updatable form. The resulting filtered representation can be denoted as follows (i=1 at this stage of the process):

$$\{\tilde{x}_{n,i}, \tilde{y}_{n,i}\}; n=0,1,2,\ldots,N-1; i=0,1,2,\ldots \quad (2)$$

In the specimen illustrated in FIG. 5B, a simple 3-tap triangular filter is used, creating a filtered initial representation as follows:

$$\{\tilde{x}_{n,i}, \tilde{y}_{n,i}\}; n=0,1,2,\ldots,87; i=1; \quad (2a)$$

$$\tilde{x}_{n,i} = 0.25 \cdot x_{n-1,i} + 0.50 \cdot x_{n,i} + 0.25 \cdot x_{n+1,i}; \quad (2b)$$
$$\tilde{y}_{n,i} = 0.25 \cdot y_{n-1,i} + 0.50 \cdot y_{n,i} + 0.25 \cdot y_{n+1,i},$$

where $(x_{-1,i}=x_{0,i}, y_{-1,i}=y_{0,i})$ and $(x_{88,i}=x_{87,i}, y_{88,i}=y_{87,i})$ are points ("samples") added as an artificial continuation of sequence (1) to reduce irregularities at the edges of filtered representation. The points of sequence (2) are again treated as vertices of a polygon, which is designated a current (i-th) filtered polygon. FIG. 5B illustrates the first (i=1) filtered polygon 520 with vertices (2a), as a particular example.

Referring again to FIG. 3, at block 312, processing logic obtains the first segment of the filtered polygon (a portion of the filtered polygon related to the first segment of the source polygon) and computes the distance along the filtered polygon from each point in the first segment of sequence (2) to the origin $(\tilde{x}_{0,i}, \tilde{y}_{0,i})$ of the segment. The resulting sequence of distances is stored in an updatable form as the first segment of a parameterization table.

At block 314, processing logic normalizes the segment of the parameterization table and reparameterizes the related segment of the source polygon. First, processing logic divides each value in the table with a length-normalizing factor $\lambda_{m,i}$, where m denotes the number of a segment, and i denotes the number of filtering iterations performed thus far (e.g., m=1 and i=1 at this stage of the process). The length-normalization factor $\lambda_{m,i}$ represents the current (i-th) ratio of total lengths between m-th segments of the filtered polygon and the source polygon. The normalized segment of the parameterization table is then stored in an updatable form. Second, processing logic relocates samples along the first segment of the source polygon. The boundary samples of the segment remain unchanged, while other samples in the segment are relocated along the source polygon in accordance with new distances defined by the normalized segment of the parameterization table.

Figures 5B, 5C:
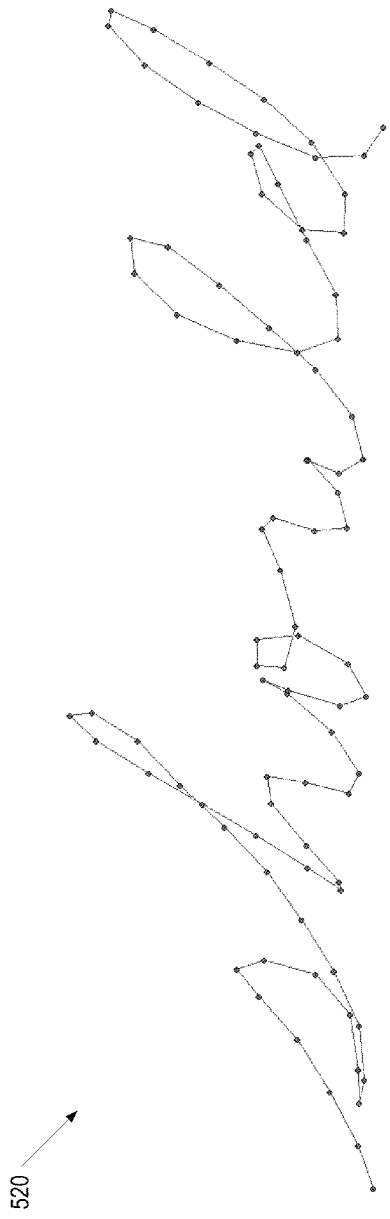

FIG. 5C illustrates an exemplary normalized parameterization table 530 for the first segment of the filtered polygon shown in FIG. 5B. The distances in the table 530 are measured with a conditional length unit equal to the sampling interval in the initial representation of the source polygon. In this particular example, the total length of the source polygon is equal to 87 conditional length units.

Figures 5D, 5E:
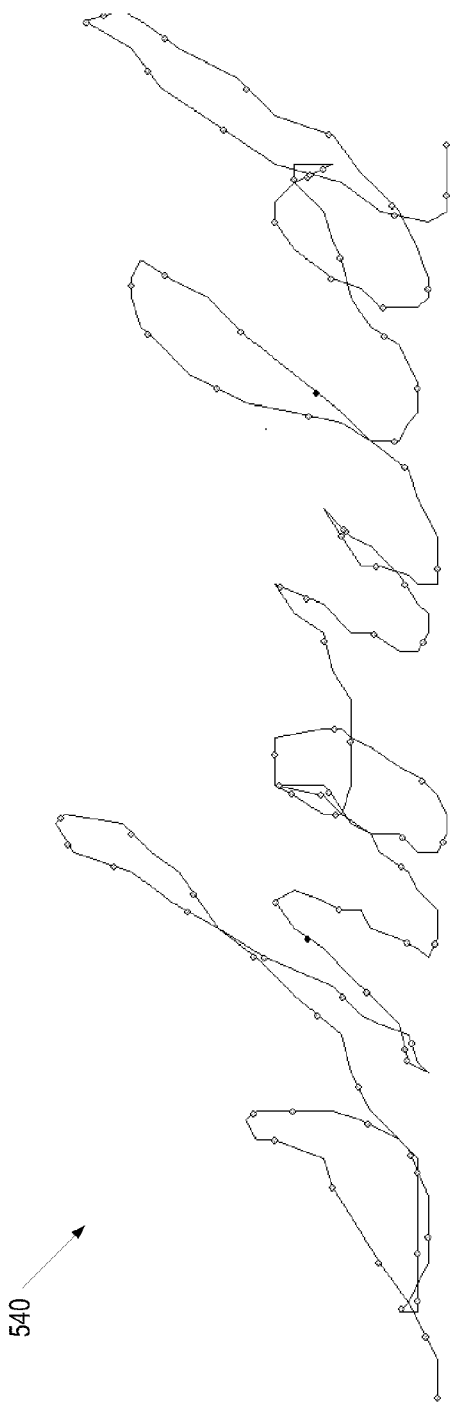

Returning to FIG. 3, at block 316, processing logic determines whether the last segment of the source polygon has been reparameterized. If not, processing logic moves to the next segment at block 312. Alternatively, if the last segment of the source polygon has been reparameterized, processing logic stores the resulting parametric representation of the entire source polygon in an updatable form (block 318). FIG. 5D illustrates the allocation of samples along the source polygon 540 at this stage of the process for the pen stroke of FIG. 4, in accordance with some embodiments of the invention.

Returning to FIG. 3, at block 320, processing logic determines whether a convergence condition is satisfied. If so, processing logic does not perform iterations any further. If not, processing logic proceeds to block 310 to perform a new iteration. In one embodiment, processing logic compares the parametric representation of the source polygon from the current iteration with the parametric representation resulted from the previous iteration and finds the maximum difference in corresponding samples. If the maximum difference between the corresponding samples exceeds a predetermined threshold (block 322), processing logic proceeds to the next iteration. If not, the convergence condition is satisfied, and processing logic stops the iterations. The last updated parametric representation of the source polygon represents the result of the encoding (filtering) procedure.

Figure 5F:
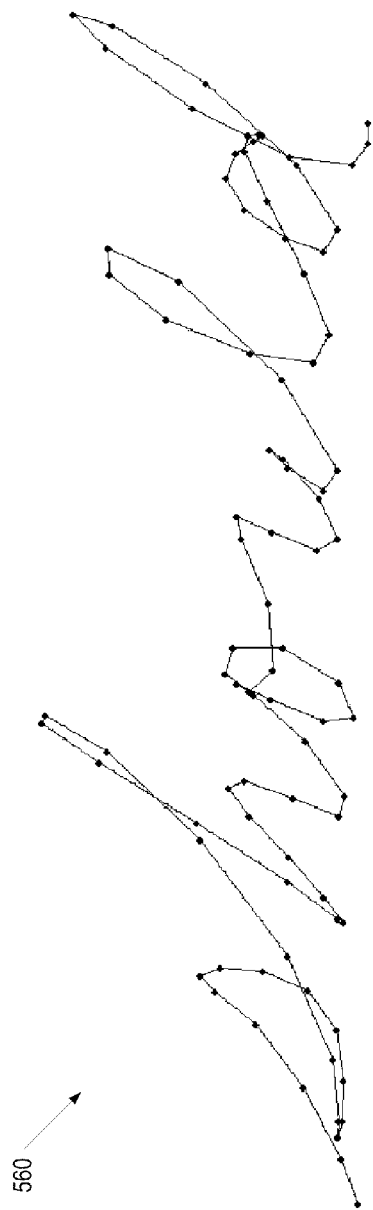
Figure 5G:
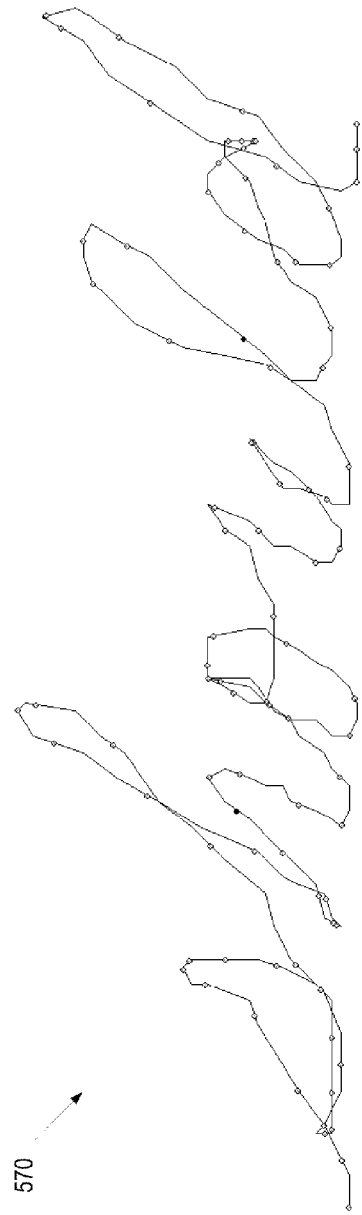

FIG. 5E illustrates the first segment 550 of the normalized parameterization table obtained during the last iteration, according to one embodiment of the invention. FIG. 5F illustrates a final version 560 of the filtered polygon, according to one embodiment of the invention. FIG. 5G illustrates the final allocation of samples along the source polygon 570, according to one embodiment of the invention. In this example, 23 iterations were performed until the global filtering-piecewise reparameterization process has converged.

It should be noted that, in the embodiment discussed above, the filtered polygon is used only as a reference for reparameterization and is not intended to represent the result of the filtering procedure. The resulting curve is actually represented parametrically by the relatively short sequence (1) of samples as they are finally allocated along the source polygon. Each component of this final representation may then be processed as a sequence of equidistant samples to reconstruct the resulting curve. The reconstruction procedure may be based on the interpolation between samples. Various reconstruction techniques (e.g., interpolation filters) may be used to reconstruct a signal from the sequence of its equidistant samples. In one embodiment, a reconstruction procedure, referred to herein as an iterative cycle of global filtering-piecewise interpolation, is used to reconstruct the curve from the final parametric representation of the source polygon. This procedure will be discussed in greater detail below in conjunction with FIG. 6.

Reconstruction Functionality

Figure 6:
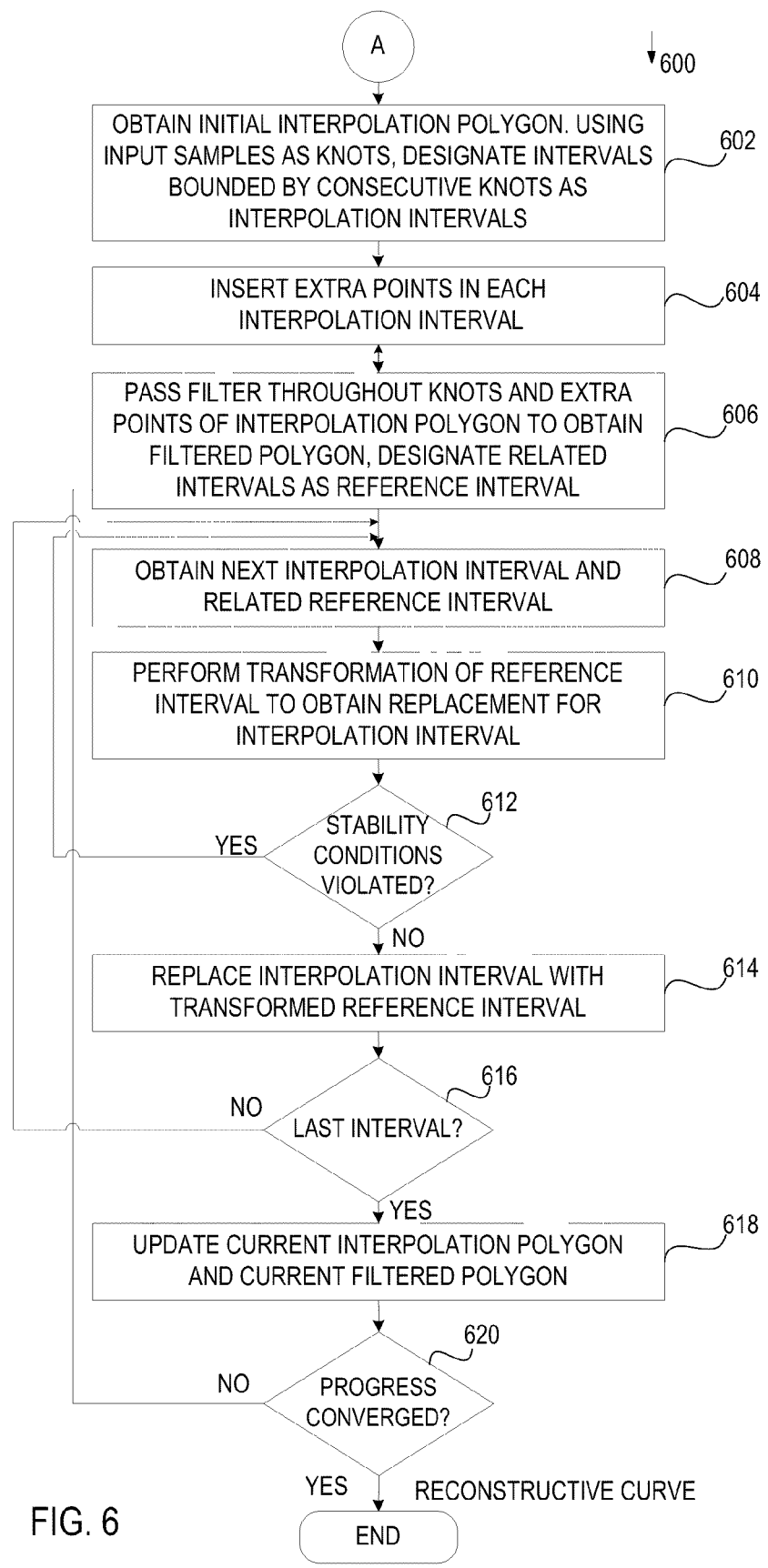
FIG. 6 is a flow diagram of one embodiment of a reconstruction method.

FIG. 6 is a flow diagram of a reconstruction method 600 according to some embodiments of the invention. The method may be performed by processing logic that may comprise hardware (e.g., circuitry, dedicated logic, etc.), software (such as run on a general purpose computer system or a dedicated machine), or a combination of both. In one embodiment, processing logic resides in a decoder (e.g., decoder 104 of FIG. 1).

Figure 7A:
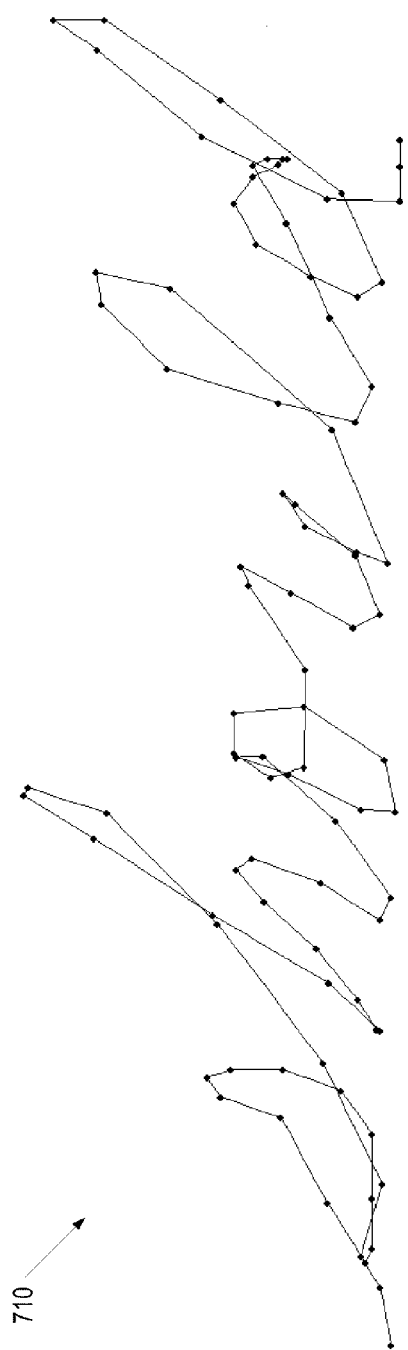
FIGS. 7A-7D illustrate reconstruction functionality according to some embodiments of the invention.

Referring to FIG. 6, method 600 begins with processing logic forming an initial interpolation polygon associated with encoded data (block 602). In particular, processing logic forms an initial interpolation polygon using the samples of final sequence (1) as vertices. Vertices are designated interpolation knots, and an interval between two consecutive knots is designated interpolation interval. FIG. 7A illustrates an initial interpolation polygon 710 for a specimen of FIG. 4, according to one embodiment of the invention.

Returning to FIG. 6, at block 604, processing logic defines a desired density of sampling points for reconstruction, and performs upsampling of interpolation polygon by inserting extra points in each interpolation interval. For example, an integer D can be defined as a sampling density factor to indicate that the filtered curve should be reconstructed with the sampling rate increased D times in comparison with the sampling rate of the initial interpolation polygon. Processing logic increases the sampling rate in accordance with chosen factor D and stores the upsampled interpolation polygon in an updatable form. In the example of the pen stroke of FIG. 4, density factor D=4 is used to reconstruct the filtered curve.

Figure 7B:
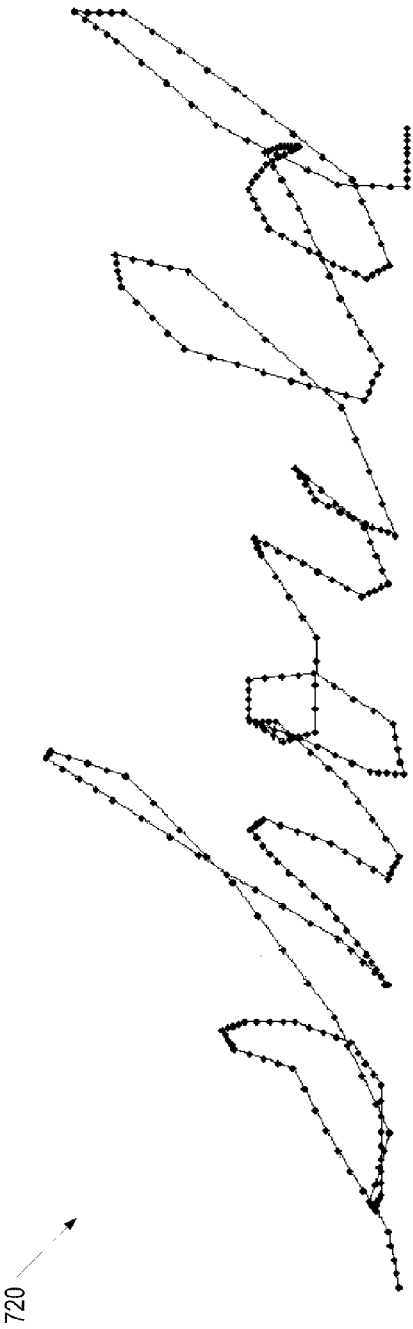

FIG. 7B illustrates the upsampled polygon 720, in which D−1=3 extra points are placed equidistantly in each interpolation interval of polygon 710, in accordance with one embodiment of the invention. The size of upsampled polygon 720 is equal to 349 samples (88+3·87=349 samples).

Figure 7C:
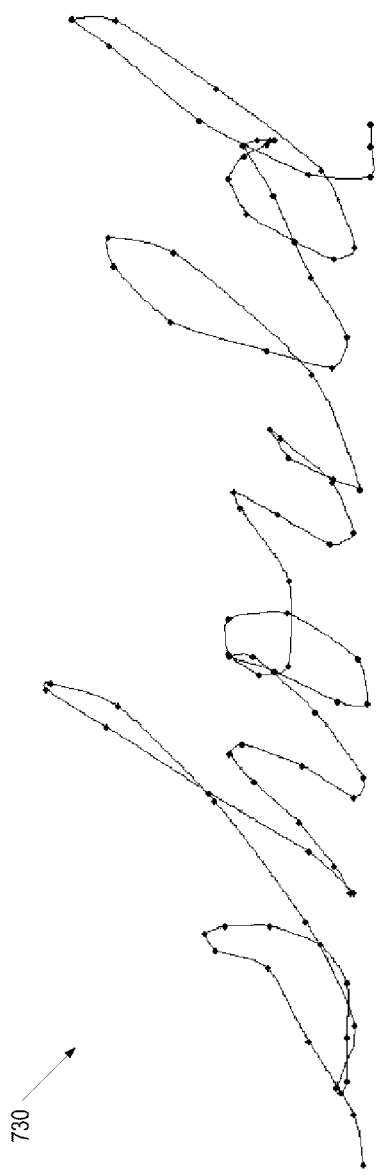

At block 606, processing logic begins iterative cycle of global filtering-piecewise interpolation by passing a filter throughout all samples of interpolation polygon, including knots and extra points. Processing logic then stores the resulting filtered polygon in an updatable form. For the exemplary pen stroke of FIG. 4, a 3-tap triangular filter was used in the global filtering-piecewise interpolation cycle. FIG. 7C illustrates the first filtered polygon 730 derived from initial interpolation polygon 720, in accordance with one embodiment of the invention. The sequence of 349 two-component samples, representing the interpolation polygon, is filtered in the manner defined by expression (3), resulting in the filtered polygon with 349 corresponding vertices. Black circles along the polygon 720 indicate 88 vertices corresponding to the knots of interpolation polygon.

Returning to FIG. 6, at block 608, processing logic begins the cycle of piecewise update of the interpolation polygon. Each interpolation interval is updated using a corresponding portion of the filtered polygon. This corresponding portion is designated a reference interval. In the example of FIG. 7C, the black circles along the filtered polygon 720 indicate the boundaries between reference intervals. Returning to FIG. 6, the first interpolation interval and related reference interval are obtained at block 608 to begin the piecewise update.

At block 610, processing logic performs the transformation of the reference interval based on characteristics of the interpolation interval. In one embodiment, the transformation is used to superimpose the starting and ending points of the reference interval upon the respective knots of the interpolation interval. For example, the similarity transformations (translation, rotation, and scaling) can be used to achieve superimposition. At block 612, processing logic determines whether the stability conditions have been violated. The stability conditions are used to ensure that the iterative filtering-interpolation process will converge to the desired reconstruction curve (that the process will stay in the zone of attraction to desired result). There are some methods known in the art that are designed to prevent the iterative processes that have multiple attractors from running outside of the desired attraction zone. In one embodiment, the reconstruction process is stabilized without reduction in convergence speed. In particular, the angle of rotation and the scaling factor defined for the transformation of the current reference interval are checked to see whether either of them exceeds a respective predetermined threshold. For example, the threshold for the absolute value of the rotation angle (the angle between the chords of interpolation and reference intervals brought to common origin) can be chosen as 10 degrees, and for scaling factor (the ratio between the lengths of respective chords) as 120%. Additional stability conditions can also be checked to ensure that the current reference interval can be transformed without significant computational errors. If either threshold is exceeded or additional stability conditions are violated, the current interpolation interval is left unchanged, and processing logic moves to the next interval (block 608). It should be noted that if an unchanged interval occurs at a given iteration, the replacement of its successors with transformed reference intervals is likely to be resumed at further iterations.

If the stability conditions are not violated, processing logic replaces the interpolation interval with the transformed reference interval (block 614). If the currently processed interval is not the last interval (block 616), processing logic moves to the next interval (block 608). Alternatively, processing logic stores the completed versions of the filtered polygon and interpolation polygon in an updatable form (block 618). It should be noted that all successive interpolation polygons obtained in the process preserve the same interpolation knots, as they were determined at block 602.

At block 620, in one embodiment, processing logic compares the current interpolation polygon and the previous interpolation polygon to determine whether a change in any interpolation interval exceeds a threshold. If so, processing logic proceeds to the next iteration. If no, processing logic stops. The threshold can be defined, for example, as a mean-square distance between D−1 intermediate points of the current interval, on one hand, and respective points obtained at the previous iteration, on the other hand.

Figure 7D:
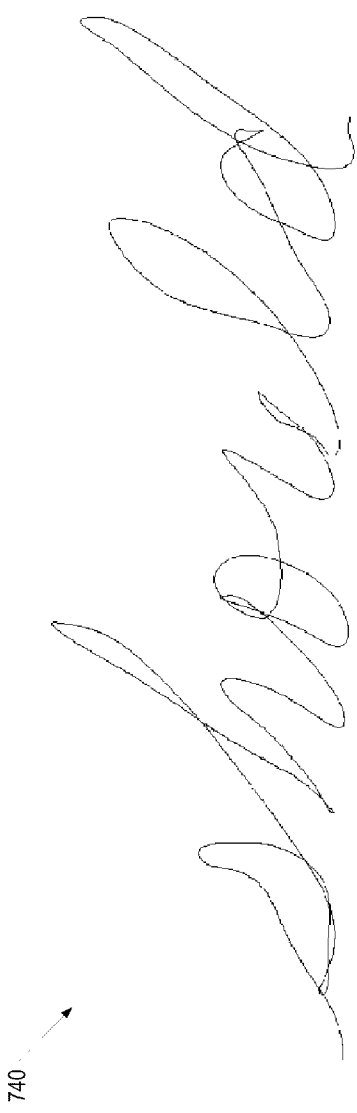

Once the method 600 ends, either the latest interpolation polygon or filtered polygon can be chosen as a result of the reconstruction process. FIG. 7D illustrates the result 740 of the reconstruction process for a specimen of FIG. 4 in accordance with one embodiment of the invention.

Figure 8A:
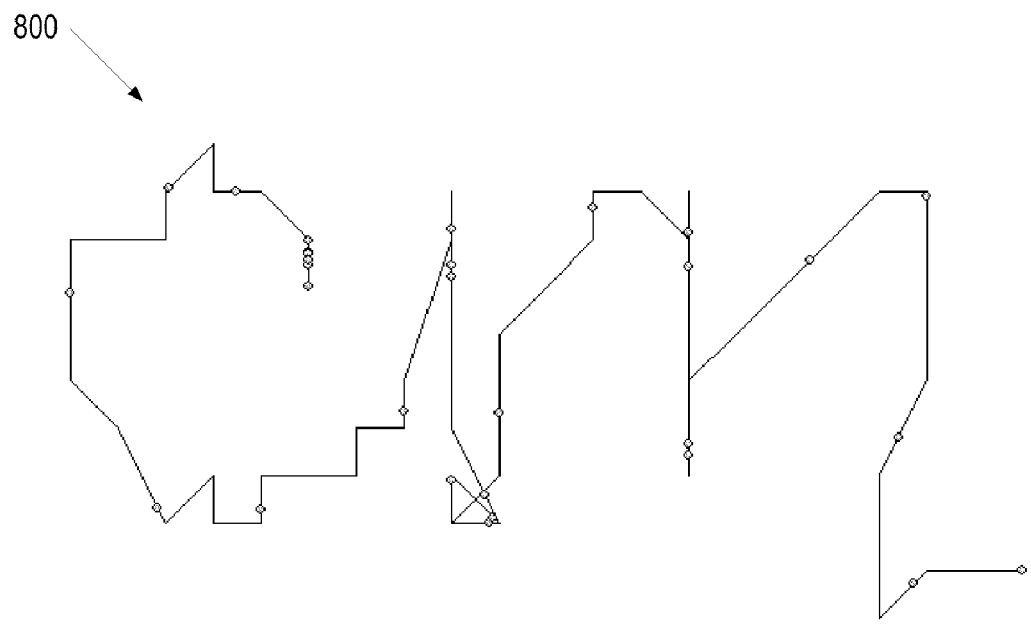
FIGS. 8A and 8B illustrate operation in a single segment mode according to some embodiments of the invention.
Figure 8B:
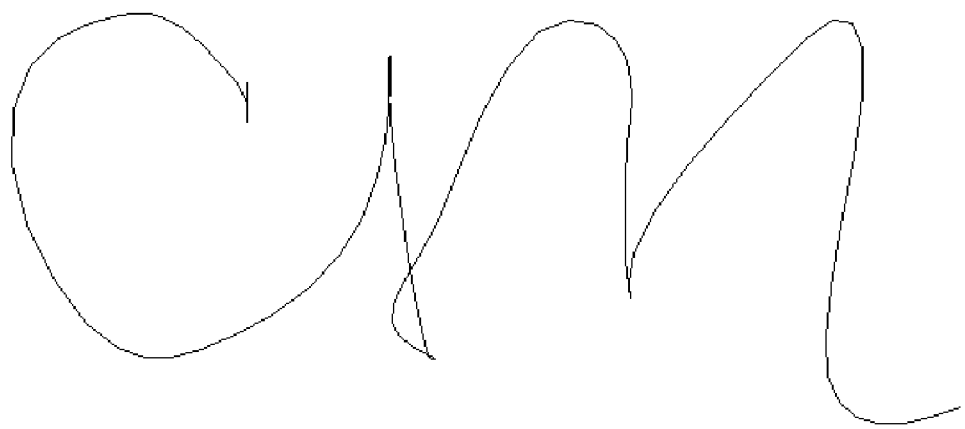

FIG. 8A illustrates an example of a shorter piece of handwriting that is processed as a single segment (in a single-segment mode). A source polygon 800 of a pen stroke was represented by 72 two-coordinate samples captured by Palm pocket PC. A boundary point coinciding with the last sample indicated a single segment mode, and 30 samples were used to resample the segment. The same 3-tap triangular filter was used for both filtering and reconstruction. It took 40 iterations for the encoding process and 6 iterations for the reconstruction process to converge. The same sampling density factor D=4 was used for interpolation. The final result of filtering and reconstruction is shown in FIG. 8B.

It should be noted that in cases of complicated shapes and/or non-homogenous noise along the curve, the multi-segment mode provides faster convergence and allows higher reconstruction quality than the single-segment mode.

Both the encoding and reconstruction processes described above are readily applicable to curves determined in spaces of arbitrary dimensionality (space curves). Space curves, as it was mentioned above, can be obtained with advanced input devices. There exist a variety of other sources of space curves. Contours and lines from volumetric images, stereo pairs, sequences of frames, medical scans, weather data, and other sources are often derived as three-dimensional space curves. Once a curve is represented parametrically as a three-component (more generally, as a multi-component) sequence of sampled coordinates, it can be processed in the same manner as described above. All polygons formed in the course of processing will be, in this case, space polygons.

The encoding and reconstruction processes described above are also applicable to multi-component sequences of samples that have, in addition to coordinate components, some extra components representing physical values other than spatial coordinates. In one embodiment (in extra-dimensional mode), the extra components are interpreted as additional coordinate components. The encoding and reconstruction processes described above are then applied to the resulting curve determined in a space of elevated dimensionality. Advanced graphic tablets, for example, may provide a number of extra components representing such values as pen's pressure and tilt. Extra components may also be found in representations of curves derived from medical scans, graphical documentation, and other sources.

Figure 9A:
FIGS. 9A and 9B illustrate operation in an extra-dimensional mode according to some embodiments of the invention.
Figure 9B:

FIG. 9A illustrates an exemplary specimen of electronic ink provided by a pressure-sensitive tablet and determined originally as a plain curve with variable thickness. In the extra-dimensional mode, this specimen is processed as a space curve with constant thickness (an extra-dimensional model of a curve). FIG. 9B illustrates the result of obtaining an extra-dimensional model, processing the model in single-segment, extra-dimensional mode, and converting the processed model back to a plain curve with variable thickness, in accordance with one embodiment of the invention.

Returning to FIG. 3, processing logic obtains (block 304) the following sequence of vertices for the source polygon of the model:

$$\{X_m, Y_m, Z_m = \alpha p_m\}; m=0,1,2,\ldots,M-1, \text{ where}$$

$X_m, Y_m$ is m-th pair of original coordinates in the preprocessed sequence of M three-component samples, $Z_m$ is m-th sample of the extra spatial coordinate representing m-th original pressure sample $p_m$ with proportionality coefficient (weight) $\alpha$. Further processing was performed in the same manner as described above. In the encoding process, the source polygon of the space model was resampled to 44 points and processed with a 3-tap triangular filter. In the reconstruction process, the interpolation polygon for a space model was upsampled to 259 points (with a density factor D=6) and processed with a 5-tap triangular filter. A serviceable value of weight a in this case was found to be 16 (it should be noted that finding a suitable value for weight is an application—specific issue). It took 21 iterations for the filtering process and 6 iterations for the reconstruction process to converge.

As can be seen in FIGS. 7, 8 and 9, the above described filtering-reconstruction processes allow noisy vector-graphic data to be reconstructed with high credibility. In the case of noisy electronic ink, the truly intended pen traces are recovered with high degree of verisimilitude. The above described processes also allow for vector-graphic data to be significantly reduced in size. As can also be seen, the cursive handwriting can be represented with the sampling rate as low as 12-15 samples per letter on average without any loss in reconstruction quality. This provides about 3 times reduction with respect to the typical rate of graphic tablets and 5-6 times reduction with respect to the rate of tablet PCs. In addition, a higher degree of lossless compression can be achieved by applying statistical coding methods known in the art.

Some aspects of filtering in the encoding and reconstruction procedures discussed herein will now be covered in more detail for the typical case of high frequency noise. Any low pass filters, such as finite impulse response (FIR) and infinite impulse response (HR) filters, can be used for both encoding and reconstruction. As a reminder, both procedures require a filter, at any filtering iteration, to be passed, according to the expression (2b), through the sequence of equidistant (i.e. parametrically equidistant) samples, in turn through each component of current parametric representation. The frequency bands of filters and component signals, in the context of the procedures discussed herein, are actually the spatial frequency bands.

In one embodiment, a filter used in the encoding has much narrower pass band than the bandwidths of component signals to be filtered. As a result, the filtered polygons obtained through the iterative process are significantly distorted, as can be seen in FIGS. 5B and 5F. However, the comparison between FIGS. 5B and 5F shows that distortions are reduced at the end of the iterative process. This effect reflects the fact that the process arrives finally to parametric representation that concentrates the energy of component signals within the narrowest possible frequency band, to match, as close as possible, the pass band of the filter. This property of the process is in the base of its filtering, size reduction, and reconstruction efficacy.

The actual bandwidth of component signals, by definition, cannot exceed ½ of the total number N+1 of samples reserved to represent the source polygon. Correspondingly, the bandwidth of a segment cannot exceed ½ of the number of samples reserved for this segment. In one embodiment, the number of samples for each segment is limited by the expected final bandwidths of component signals, i.e., the bandwidths narrowed by the finally obtained parametric representation. This limitation can be imposed from the very beginning of the process, as illustrated by sampling rates chosen to process specimens of FIGS. 4, 8A, and 9A. Such limitation provides the maximal size reduction. Alternatively, as one can easily see, the number of samples can be adjusted in the course of the iterative process to be finally properly minimized.

It should be noted that changes in the sampling rate during the filtering process affect the relative pass band of a given filter. The higher is the sampling rate, the broader is the relative pass band of a given filter. To keep the relative pass band approximately the same, the number of taps in the filter's window, for example, can be changed in accordance with the change in the sampling rate.

The reconstruction process discussed herein deals with the interpolation polygon sampled initially at the rate defined during filtering (encoding) and then upsampled by a factor D during reconstruction. In one embodiment, a filter used to run the reconstruction process has a pass band wide enough to provide only a moderate smoothing of the upsampled interpolation polygon. In particular, in examples related to specimens of FIGS. 4 and 8A, the same 3-tap triangular filter runs both the filtering process and the reconstruction process. The filter is smoothing moderately in the reconstruction process since its relative pass band becomes 4 times wider due to upsampling by factor D=4. However, should the curves be reconstructed, for example, with D=10, a 7-tap triangular filter would be preferable to run the reconstruction process.

It should be noted that despite piecewise reparameterization and piecewise reconstruction the finally obtained curves have no irregularities at the joints of the segments and interpolation intervals. A high degree of continuity at the joints is provided automatically. It should also be noted that the above described reconstruction process can be fine tuned, if required by a specific application, by varying the filter parameters.

Direct Reconstruction Functionality

Size reduction may be not important for some applications requiring high performance filtering. To address the needs of such applications, a special procedure is used that is referred to herein as a direct reconstruction procedure.

Figure 10:
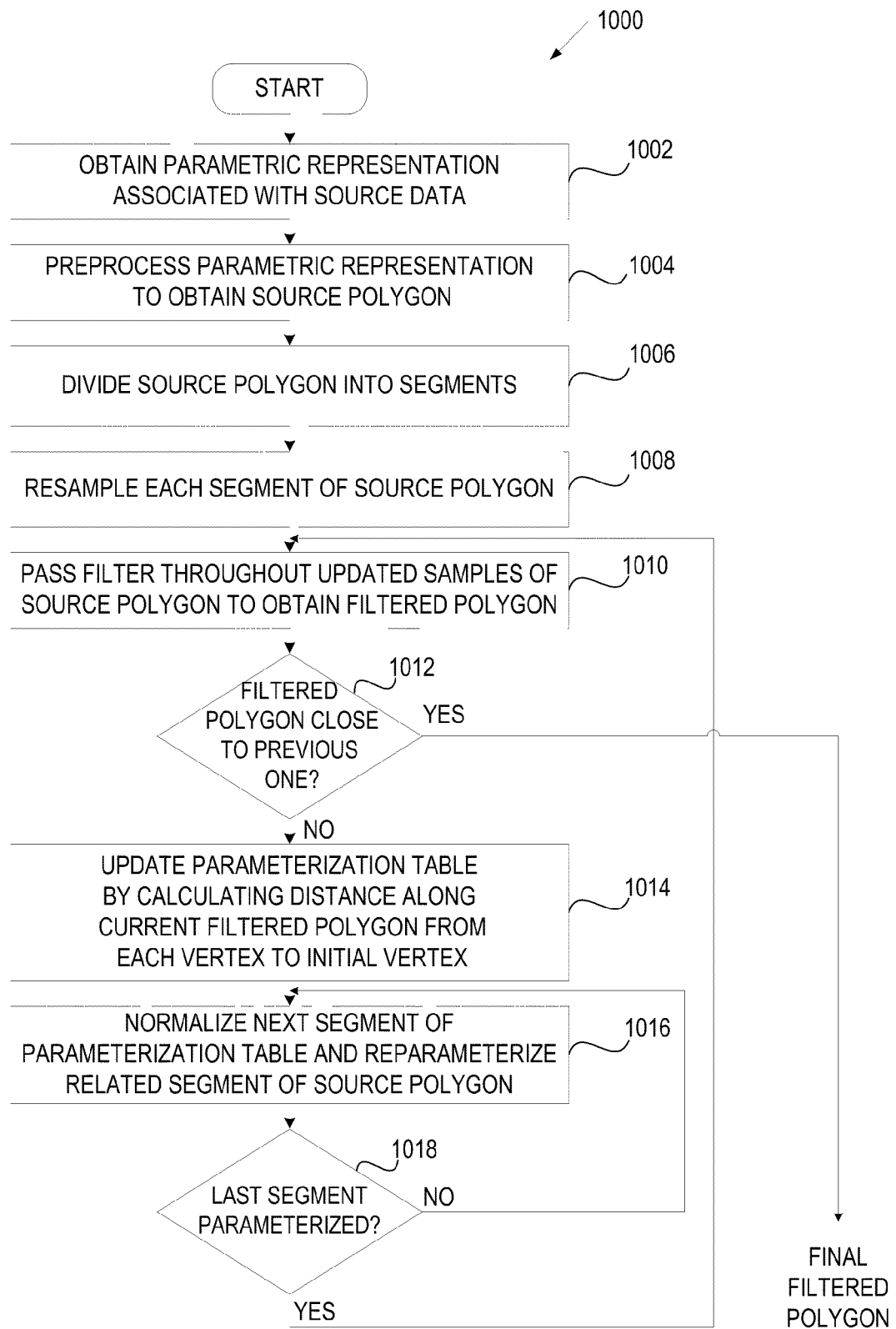
FIG. 10 is a flow diagram of one embodiment of a direct reconstruction method.

In one embodiment, in a direct reconstruction procedure, the reconstruction process discussed above is eliminated, and the filtering process discussed above is used in a special mode of operation. FIG. 10 is a flow diagram illustrating a filtering procedure used in a special mode of operation, in accordance with one embodiment of the invention. The method may be performed by processing logic that may comprise hardware (e.g., circuitry, dedicated logic, etc.), software (such as run on a general purpose computer system or a dedicated machine), or a combination of both.

Referring to FIG. 10, method 1000 begins with processing logic obtaining a parametric representation associated with source data (block 1002), preprocessing the parametric representation to obtain a source polygon (block 1004), and dividing the source polygon into segments (block 1006).

At block 1008, processing logic resamples each segment of the source polygon (block 1008) using a high enough sampling rate to meet the sampling density requirements of reconstruction. At block 1010, processing logic passes a filter throughout the updated samples of the source polygon to obtain a filtered polygon. The filter used to obtain the filtered polygon has to meet some specific requirements, as discussed below. The filtered polygon is used not only as a reference for reparameterization, but also as a reconstruction result. After the filtered polygon is updated at the current iteration, processing logic determines whether a convergence condition is satisfied (block 1012). If so, processing logic does not perform iterations any further, and the updated filtered polygon is provided as a reconstruction result. If not, processing logic proceeds to block 1014 to perform a new iteration. In one embodiment, processing logic compares the parametric representation of the filtered polygon from the current iteration with the parametric representation resulted from the previous iteration and finds the maximum difference in corresponding samples. If the maximum difference between the corresponding samples exceeds a predetermined threshold (block 1012), processing logic proceeds to the next iteration. If not, the convergence condition is satisfied, and processing logic stops the iterations.

Figure 11A:
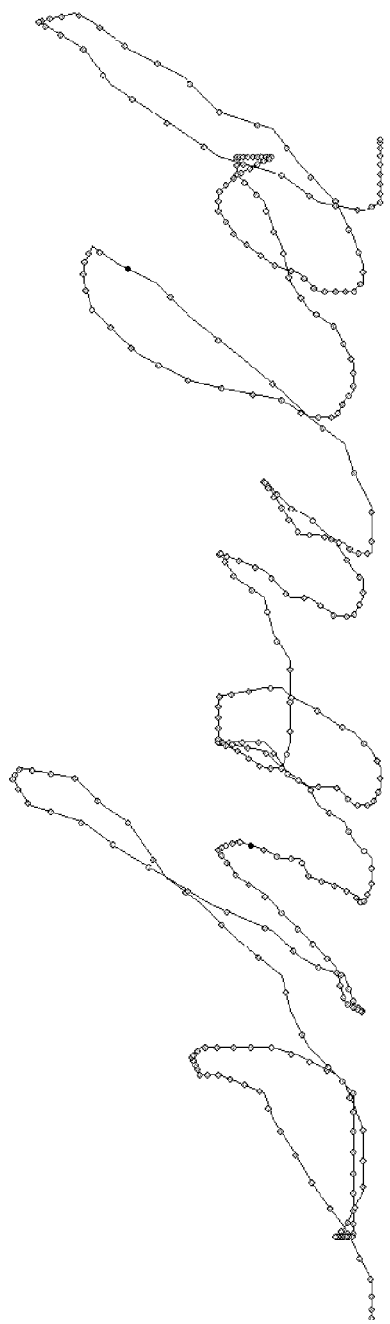
FIGS. 11A and 11B illustrate direct reconstruction functionality according to some embodiments of the invention.
Figure 11B:
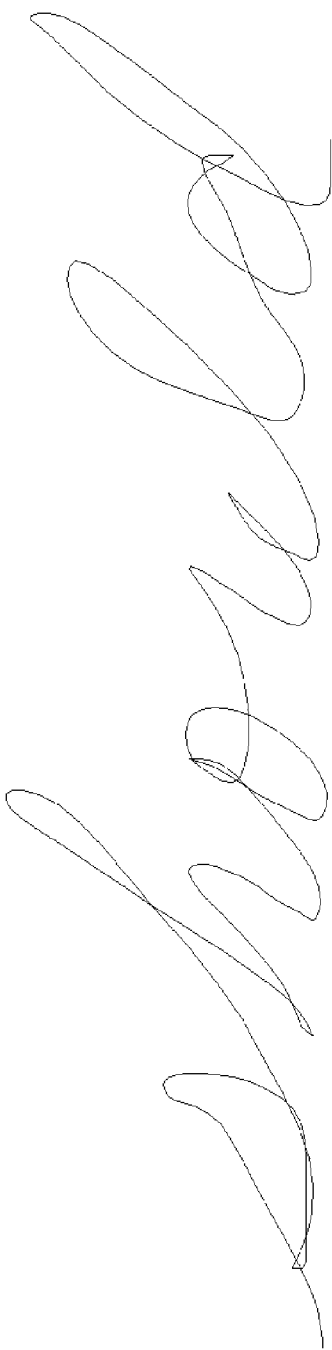

In an example related to a specimen of FIG. 4, 110 samples are reserved for each of three segments. The total size of the resampled source polygon in this case is 328 two-component samples. A 5-tap triangular filter is used to run the direct reconstruction process. The finally obtained allocation of samples along the source polygon is shown in FIG. 11A. The reconstruction result, represented by the finally obtained filtered polygon, is shown in FIG. 11B. It took 60 iterations for the process to converge.

The basic properties of the process in the direct reconstruction mode are the same as discussed above. The energy of component signals is again concentrated at the low end of their bandwidth to meet, as much as possible, the limited pass band of a filter, while residual noise tends to remain closer to the high end of the bandwidth. This makes it possible to have the residual noise efficiently suppressed.

In one embodiment, the cut-off frequency of a filter is less then the low-end frequency of the noise spectrum. The relative pass band of a filter can meet this requirement, even if the signal and noise have partially overlapping spectra, from the very beginning of the process. One can easily see that the pass band of a filter can also be adjusted in the course of the process if needed to find the best balance between the residual noise and shape distortions.

As will be apparent to those of skill in the area, the direct reconstruction procedure can be performed as well in a single-segment and an extra-dimensional modes.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A computerized method for encoding source data, the method comprising:
    defining a source polygon using parametric representation associated with the source data;
    identifying one or more portions of the source polygon, wherein each portion of the source polygon comprises a plurality of sample points;
    passing a filter throughout a sequence of samples representing the source polygon to obtain a filtered polygon;
    performing, by a processor, piecewise re-parameterization of each portion of the source polygon using a corresponding portion of the filtered polygon to obtain an updated sequence of samples representing the source polygon; and
    iteratively repeating, by the processor, the passing of the filter and the piecewise re-parameterization until a convergence condition is satisfied, to provide encoded data.

2. The method of claim 1 wherein the source data is available in vector-graphic form or convertible into vector-graphic form.

3. The method of claim 1 wherein the encoded data comprises a last updated sequence of samples representing the source polygon, the source polygon and a last filtered polygon, or the last filtered polygon.

4. The method of claim 1 further comprising:
defining a sampling rate for each of the identified one or more portions of the source polygon; and
re-sampling each of the identified one or more portions of the source polygons based on a corresponding sampling rate.

5. The method of claim 4 wherein the filter is passed throughout an entire sequence of samples representing a re-sampled source polygon without considering a division into portions.

6. The method of claim 1 wherein the source polygon consists of a single portion.

7. The method of claim 1 wherein performing the piecewise re-parameterization of each portion of the source polygon comprises:
for each sample in a re-parameterized portion, computing a distance along the filtered polygon from a corresponding sample of the filtered polygon to an initial point, the initial point being a beginning of the filtered polygon or a beginning of the re-parameterized portion;
storing, for each portion, resulting distances in a corresponding part of a re-parameterization table;
normalizing, for each portion, the stored distances using a corresponding length-normalizing factor; and
relocating samples along the source polygon in the portion being re-parameterized using normalized distances from a corresponding part of the re-parameterization table.

8. The method of claim 7 further comprising:
keeping boundary samples of the re-parameterized portion unchanged while relocating the samples along the source polygon in the re-parameterized portion.

9. The method of claim 1 further comprising:
reconstructing the source data from the encoded data.

10. The method of claim 9 wherein reconstructing the source data comprises:
forming an initial interpolation polygon using a sequence of samples within the encoded data as knots;
up-sampling the interpolation polygon by inserting a set of extra samples in each interval between every two consecutive knots of the interpolation polygon, a number of extra samples being the same in each interval;
passing a filter throughout a sequence of samples representing the up-sampled interpolation polygon;
performing a piecewise update of each interval of the interpolation polygon using a corresponding portion of the filtered polygon as a reference interval; and
repeating the passing of the filter and the piecewise update of each interval until a reconstruction condition is satisfied, wherein a last updated interpolation polygon represents reconstructed source data.

11. The method of claim 10 wherein performing the piecewise update of each interval of the interpolation polygon comprises:
transforming a corresponding reference interval to fit between knots of an interpolation interval representing a current interval of the interpolation polygon.

12. The method of claim 11 wherein performing the piecewise update of each interval of the interpolation polygon further comprises:
if a stability condition for the interpolation interval is not violated, replacing the interpolation interval with the transformed reference interval; and
if the stability condition is violated, keeping the interpolation interval unchanged.

13. The method of claim 12 wherein the stability condition requires that an angle of rotation and a scaling factor for the reference interval be within corresponding thresholds when the reference interval is transformed to fit between the knots of the interpolation interval.

14. The method of claim 10 further comprising;
adjusting filtering parameters based on a specific application while repeating the passing of the filter.

15. The method of claim 1 further comprising:
adjusting filtering parameters during iterations based on a specific application.

16. The method of claim 1 wherein the parametric representation associated with the source data comprises spatial and non-spatial parts of the source data, the non-spatial parts being used as additional spatial coordinates weighted with adjustable proportionality coefficients.

17. A non-transitory computer-readable medium having executable instructions to cause a computer system to perform a method for encoding source data, the method comprising:
defining a source polygon using parametric representation associated with the source data;
identifying one or more portions of the source polygon, wherein each portion of the source polygon comprises a plurality of sample points;
passing a filter throughout a sequence of samples representing the source polygon to obtain a filtered polygon;
performing piecewise re-parameterization of each portion of the source polygon using a corresponding portion of the filtered polygon to obtain an updated sequence of samples representing the source polygon; and
iteratively repeating the passing of the filter and the piecewise re-parameterization until a convergence condition is satisfied, to provide encoded data.

18. The computer-readable medium of claim 17 wherein the method further comprises:
defining a sampling rate for each of the portions; and
re-sampling each of the portions based on a corresponding sampling rate.

19. The computer-readable medium of claim 17 wherein performing the piecewise re-parameterization of each portion of the source polygon comprises:
for each sample in a re-parameterized portion, computing a distance along the filtered polygon from a corresponding sample of the filtered polygon to an initial point, the initial point being a beginning of the filtered polygon or a beginning of the re-parameterized portion;
storing, for each portion, resulting distances in a corresponding part of a re-parameterization table;
normalizing, for each portion, the stored distances using a corresponding length-normalizing factor; and
relocating samples along the source polygon in the portion being re-parameterized using normalized distances from a corresponding part of the re-parameterization table.

20. The computer-readable medium of claim 17 wherein the method further comprises reconstructing the source data from the encoded data by:
forming an initial interpolation polygon using a sequence of samples within the encoded data as knots;
up-sampling the interpolation polygon by inserting a set of extra samples in each interval between every two consecutive knots of the interpolation polygon, a number of extra samples being the same in each interval;
passing a filter throughout a sequence of samples representing the up-sampled interpolation polygon;
performing a piecewise update of each interval of the interpolation polygon using a corresponding portion of the filtered polygon as a reference interval; and repeating the passing of the filter and the piecewise update of each interval until a reconstruction condition is satisfied, wherein a last updated interpolation polygon represents reconstructed source data.

21. The computer-readable medium of claim 20 wherein performing the piecewise update of each interval of the interpolation polygon comprises:
   transforming a corresponding reference interval to fit between knots of an interpolation interval representing a current interval of the interpolation polygon;
   if a stability condition for the interpolation interval is not violated, replacing the interpolation interval with the transformed reference interval; and
   if the stability condition is violated, keeping the interpolation interval unchanged.

22. A system for encoding source data, comprising:
   a memory; and
   an encoder to define a source polygon based on a parametric representation associated with the source data, to identify one or more portions in the source polygon, wherein each portion in the source polygon comprises a plurality of sample points, to pass a filter throughout the source polygon, to perform piecewise re-parameterization of each segment of the source polygon to obtain an updated parametric representation of the source polygon, and to iteratively repeat the passing of the filter and the piecewise re-parameterization until a convergence condition is satisfied, to provide encoded data, wherein the encoder is to perform the piecewise re-parameterization of each portion of the source polygon by
      for each sample in a re-parameterized portion, computing a distance along the filtered polygon from a corresponding sample of the filtered polygon to an initial point, the initial point being a beginning of the filtered polygon or a beginning of the re-parameterized portion,
      storing, for each portion, resulting distances in a corresponding part of a re-parameterization table,
      normalizing, for each portion, the stored distances using a corresponding length-normalizing factor, and
      relocating samples along the source polygon in the portion being re-parameterized using normalized distances from a corresponding part of the re-parameterization table.

23. The system of claim 22 wherein the encoder is further to define a sampling rate for each of the portions, and to re-sample each of the portions based on a corresponding sampling rate.

24. A system for encoding source data, comprising:
   a memory;
   an encoder to define a source polygon based on a parametric representation associated with the source data, to identify one or more portions in the source polygon, wherein each portion in the source polygon comprises a plurality of sample points, to pass a filter throughout the source polygon, to perform piecewise re-parameterization of each segment of the source polygon to obtain an updated parametric representation of the source polygon, and to iteratively repeat the passing of the filter and the piecewise re-parameterization until a convergence condition is satisfied, to provide encoded data; and
   a decoder to reconstruct the source data from the encoded data including
      forming an initial interpolation polygon using a sequence of samples within the encoded data as knots;
      up-sampling the interpolation polygon by inserting a set of extra samples in each interval between every two consecutive knots of the interpolation polygon, a number of extra samples being the same in each interval;
      passing a filter throughout a sequence of samples representing the up-sampled interpolation polygon;
      performing a piecewise update of each interval of the interpolation polygon using a corresponding portion of the filtered polygon as a reference interval; and
      repeating the passing of the filter and the piecewise update of each interval until a reconstruction condition is satisfied, wherein a last updated interpolation polygon represents reconstructed source data.

25. The system of claim 24 wherein the decoder is to perform the piecewise update of each interval of the interpolation polygon by:
   transforming a corresponding reference interval to fit between knots of an interpolation interval representing a current interval of the interpolation polygon;
   if a stability condition for the interpolation interval is not violated, replacing the interpolation interval with the transformed reference interval; and
   if the stability condition is violated, keeping the interpolation interval unchanged.

* * * * *